(12) United States Patent
Tavares et al.

(10) Patent No.: US 8,600,871 B1
(45) Date of Patent: Dec. 3, 2013

(54) CREDIT AND PREPAID FINANCIAL CARD

(75) Inventors: Felicia Ann Tavares, San Antonio, TX (US); Stephen Daniel Armstrong, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 72 days.

(21) Appl. No.: 12/048,398

(22) Filed: Mar. 14, 2008

(51) Int. Cl.
*G06Q 40/00* (2012.01)

(52) U.S. Cl.
USPC ................................ 705/38; 705/35

(58) Field of Classification Search
USPC ................................ 705/38, 40, 35
See application file for complete search history.

(56) References Cited

U.S. PATENT DOCUMENTS

| | | | |
|---|---|---|---|
| 5,500,513 A | | 3/1996 | Langhans et al. |
| 5,923,884 A | | 7/1999 | Peyret et al. |
| 5,953,710 A | * | 9/1999 | Fleming ........................... 705/38 |
| 5,974,146 A | * | 10/1999 | Randle et al. .................... 705/77 |
| 6,529,885 B1 | * | 3/2003 | Johnson ........................... 705/64 |
| 7,172,112 B2 | * | 2/2007 | Bonalle et al. ................ 235/379 |
| 7,191,952 B2 | * | 3/2007 | Blossom ...................... 235/492 |
| 7,357,331 B2 | | 4/2008 | Blossom |
| 2002/0046341 A1 | | 4/2002 | Kazaks et al. |
| 2003/0015589 A1 | * | 1/2003 | Jimenez ........................ 235/493 |
| 2003/0197058 A1 | | 10/2003 | Benkert et al. |
| 2005/0125342 A1 | * | 6/2005 | Schiff ............................ 705/39 |
| 2007/0083477 A1 | | 4/2007 | Bolle et al. |
| 2009/0063339 A1 | | 3/2009 | Santora |
| 2009/0138397 A1 | | 5/2009 | Sharma |

OTHER PUBLICATIONS

Hazard, Carol; "Credit or Debit? Now Question of the hour for the consumer"; Richomnd Times; Sep. 27, 1999; ProQuest ID: 423705845.*
Cohen, Howard; "Debit cards start to make their move as surprise banking product of the 90s"; Bank Marketing; Mar. 1991; ISSN: 08883149.*
Stuber, Gerald. "The Electronic Purse—An Overview of Recent Developments and Policy Issues." Jan. 1996, pp. 1-74, ISSN 0713-7931. Printed in Canada.
Paypal, "PayPal ATM/Debit Card Agreement"; Retrieved from the internet <URL: http://www.creditcards.com/>. pp. 1-3. Copyright © 1999-2008 PayPal.
CreditCards.com, "Finding the Best Credit Card Offer is . . . " Retrieved from the internet <URL:http://www.cabinetng.com/solutions/electronic-document-management.php>. Copyright © 2008 CreditCards.com.

\* cited by examiner

*Primary Examiner* — Edward Chang
(74) *Attorney, Agent, or Firm* — Perkins Coie LLP

(57) ABSTRACT

A financial card is issued to a user that is set to behave like a prepaid card as the card can only have a positive balance, and funds may be added to this balance to be spent. At any time, the user may change the financial card to behave like a credit card, thereby allowing spending on credit. Alternatively, the financial card may be issued as a credit card and may be changed to a prepaid card. The financial card has a single account number, regardless of whether it is set to behave like a prepaid card or a credit card, and regardless of whether it is switched from one operating mode to another.

18 Claims, 6 Drawing Sheets

CREDIT AND PREPAID FINANCIAL CARD

CROSS-REFERENCE TO RELATED APPLICATIONS

This application is related by subject matter to that disclosed in the following commonly assigned applications, the entirety of which are hereby incorporated by reference herein: U.S. patent application Ser. No. 12/048,348, U.S. patent application Ser. No. 12/048,357, U.S. patent application Ser. No. 12/048,365, and U.S. patent application Ser. No. 12/048,389, each filed on Mar. 14, 2008 and each entitled "Credit And Prepaid Financial Card."

BACKGROUND

A credit card is a system of payment in which money is not removed from the user's account after every transaction. The issuer lends money to the user to be paid to the merchant. It is also does not require that the balance be paid in full each month. A credit card allows the user to revolve their balance, at the cost of having interest charged.

A secured credit card is a type of credit card secured by a deposit account owned by the user. Typically, the user must deposit between 100% and 200% of the total amount of credit desired. Thus, if the user puts down $1000, they will be given credit in the range of $500-$1000. This deposit is held in a special savings account. The user of a secured credit card is still expected to make regular payments, as they would with a regular credit card, but should they default on a payment, the card issuer has the option of recovering the cost of the purchases paid to the merchants out of the deposit.

A prepaid credit card (referred to herein as a "prepaid card") is not really a credit card, as no credit is offered by the card issuer: the user spends money which has been "stored" via a prior deposit by the user or someone else, such as a parent or employer. However, it carries a credit card brand (e.g., Visa or MasterCard) and can be used in similar ways. After purchasing the card, the user loads it with any amount of money and then uses the card to spend the money. As more consumers require a suitable solution to rebuilding credit, recent changes have allowed some credit card companies to offer prepaid credit cards to help rebuild credit. Credit card companies as well as various other financial institutions may issue both types of cards to a user with different card numbers.

SUMMARY

A financial card is issued to a user that is set to behave like a prepaid card as the card can only have a positive balance, and funds may be added to this balance to be spent. At any time, the user may change the financial card to behave like a credit card, thereby allowing spending on credit. Alternatively, the financial card may be issued as a credit card and may be changed to a prepaid card. The financial card has a single account number, regardless of whether it is set to behave like a prepaid card or a credit card, and regardless of whether it is switched from one operating mode to another.

In an implementation, online controls are provided that may be used to monitor spending on the financial card, implement rules relating to the financial card, and/or suspend financial card activity. A user who is a card manager may log in and view account information, such as prepaid balance, credit balance, and balance owed.

In an implementation, a gift giver feature may be provided. A user who is a card manager may add a gift giver. The gift giver may be provided with instructions as to how to add money to the financial card. The gift giver can give monetary payments regardless of the operating mode of the financial card. If the financial card is in a prepaid mode, funds may be added to the financial card. If the financial card is in credit mode, funds may be added to the balance as a payment, or if there is no balance the funds may be added as a prepaid balance.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there are shown in the drawings example constructions of the embodiments; however, the embodiments are not limited to the specific methods and instrumentalities disclosed. In the drawings.

DETAILED DESCRIPTION

Figure 1:
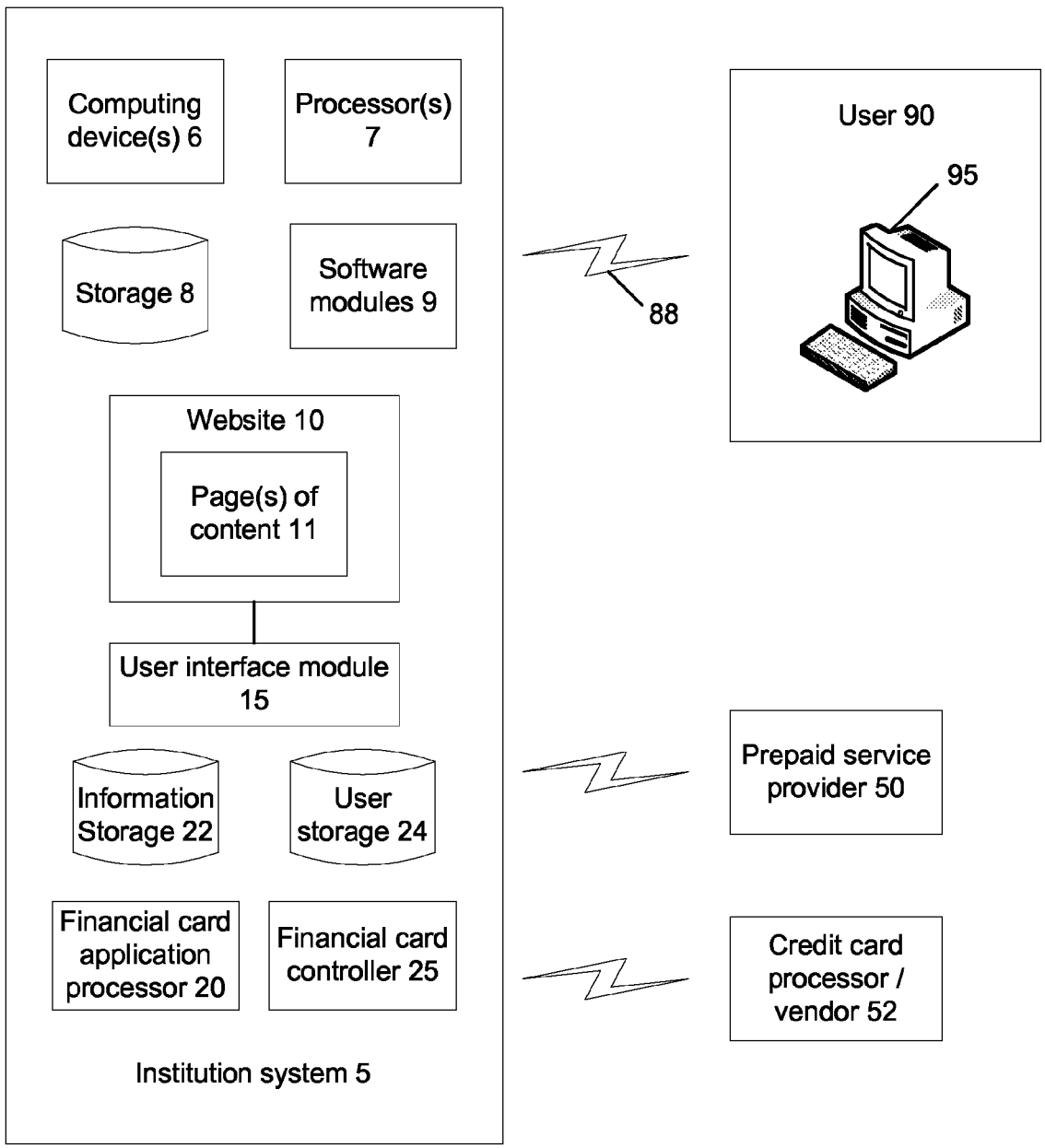
FIG. 1 is a block diagram of an implementation of a system that may be used to provide and manage a credit and prepaid financial card.

FIG. 1 is a block diagram of an implementation of a system that may be used to provide and manage a credit and prepaid financial card. An institution system 5, associated with or otherwise maintained by an institution such as a financial services institution, may include a financial card application processor 20 that may process a financial card request to apply for a financial card from a user computing device 95 associated with a user 90. The financial card may be initially set to behave like a prepaid card or a credit card. As described further herein, at any time, the user may change the operating mode or behavior of the card, e.g., from prepaid card mode to credit card mode and vice versa.

The financial card application processor 20 may request and receive information from the user 90 via a financial card application that the user may fill out and provide to the institution system 5. The user 90 may fill out the application using the user computing device 95 and electronically send the application to the institution system 5, such as via a website, email, or facsimile, for example. Alternatively, the user 90 may send the application to the institution system 5 by postal service or any other delivery method. The financial card application processor 20 may retrieve information from storage, such as information storage 22 and user storage 24, and use the information in processing the request for a financial card. The financial card application processor 20 may also store information pertaining to the user and the financial card application in storage, such as information storage 22 and user storage 24.

The financial card application processor 20 may send the application information (e.g., over the network 88) to one or more credit reporting bureaus (e.g., Equifax, Experian, TransUnion, etc.) to obtain a report of the user's credit history. The credit history report may be obtained in real time in order to expedite processing of the refinance loan application, but it is possible to delay the report. A determination may then be made by the institution system 5 as to whether the user 90 qualifies for a financial card based, for example, on their credit history and the institution's internal policies. The user 90 may be notified by the institution system 5 of a decision on the financial card request via the user computing device 95.

A financial card controller 25 may be involved in maintaining the various aspects, features, and behaviors of financial cards as described herein. Such aspects, features, and behaviors may include operating modes, rules, gift givers, etc. The financial card controller 25 may receive instructions or other data from the user 90 via the user computing device 95, for example, and may operate in conjunction with other components of the institution system 5 as well as other entities such as a prepaid service provider 50 and a credit card processor/vendor 52.

The prepaid service provider 50 may be an entity that provides services pertaining to prepaid aspects and behaviors of financial cards. The credit card processor/vendor 52 may be an entity that provides services pertaining to credit aspects and behaviors of financial cards. The prepaid service provider 50 and the credit card processor/vendor 52 may be in communication with the institution system via a network, such as the network 88. It is contemplated that the institution system 5 may handle such prepaid and/or credit aspects and/or behaviors of financial cards, and that the prepaid service provider 50 and/or the credit card processor/vendor 52 may not be used.

Information storage 22 may contain information pertaining to accounts or products hosted by the institution system, as well as operating modes, rules, gift givers, etc., for example. Information storage 22 may include data that may be used in the generation of a financial card application, the decision of a user's qualification for a financial card, and the maintenance of a financial card. User storage 24 may contain information directed to users, such as name, address, account information, products owned, etc., for example.

Information directed to financial cards, such as operating modes, rules, gift givers, balances, etc. may be provided via a website 10 to the user computing device 95 associated with a user 90. For purposes of clarity and simplicity, an applicant for a financial card may be referred to herein as a "user". Thus, a financial card may be issued to a user in the name of the user. Any reference to a user herein also includes any type of applicant, institution member or prospective member, or the like. As described further herein, the user may provide the financial card to another person, such as their child for example. This person may be referred to herein as a "cardholder."

In an implementation, instead of hosting the website 10, the institution system 5 may comprise a conventional application server hosting a proprietary online service accessible only by a private network. In any event, the institution system 5 may have appropriate security mechanisms in place to prevent unauthorized third parties from intercepting the user's information.

The user 90 may provide data to the institution system 5 via the user computing device 95. The user computing device may be a handheld computing device such as a personal digital assistant (PDA) or a mobile phone, for example, or any type of personal computer (PC). The user computing device and the institution system 5 may be connected over a network 88. It is contemplated that the network 88 may be any type of private or public communication network such as, for example, an intranet, Internet, local area network (LAN), wide area network (WAN), wireless fidelity (WiFi) network, cellular connection, plain old telephone service (POTS), and the like. An example user computing device is described with respect to FIG. 6.

In an implementation, a user interface module 15 may receive content from the financial card application processor 20 or the financial card controller 25 and format one or more pages of content 11 as a unified graphical presentation that may be provided to a user computing device 95. The page(s) of content 11 may be directed to financial card information and may be provided to the user computing device 95 via the website 10 associated with the institution system 5.

When the user 90 accesses the website 10, using a web browser on the user computing device 95, they may be presented with financial card information such as balances, operating modes, rules, gift givers, etc., via the page(s) of content 11. The information may be displayed on one or more web pages, further described with respect to FIG. 3, for example. The user 90 may enter information into the web pages via a web browser on the user computing device 95.

The content may be personalized to the user 90, using information retrieved from the user storage 24, for example. Personalization may include presentation of the page(s) of content 11 and/or functionality of the page(s) of content 11. For example, a graphical representation displayed on the page(s) of content 11 may be pre-filled with some information pertaining to the user, such as name, address, account number, etc. In an implementation, personalization may be directed to a financial card and/or other products that the user may own, and may provide specific information on the user's financial card(s) and/or other products, such as amounts, due dates, etc., for example. Personalization is not limited to financial cards and may be directed to any type of data, information, product, service, advertisement, etc.

As described further herein, in an implementation, the user 90 may select a change card mode button or icon presented on a web page. Selecting the change card mode button or icon allows the user to change the operating mode of their financial card, e.g., from a credit card to a prepaid card or vice versa. Additionally, the user may be provided with one or more documents online, via the website 10 or via email for example, that they can electronically sign. Such documents may be directed to a financial card application, operating mode changes, rules implementation, gift giver authorization, scheduling a funds transfer, etc. Any known electronic signature technique may be may used. The user 90 may electronically sign the one or more documents and provide them electronically to the institution system 5, via email or the website 10 for example.

A user access system may be implemented as a web server in an implementation. The user access system, through the use of any suitable interactive web technology, provides an interactive experience to the user 90 through which access to and maintenance of their financial card can be accomplished. Any technology that provides interactivity through a web browser is considered to be within the scope of the present discussion and may include, without limitation, Hyper-Text Mark-Up Language (HTML), Dynamic HTML (DHTML), JavaScript, and Ajax.

In an implementation, the institution may be a financial services institution having a financial services website. On the website, in a common space, the user may be presented with financial advice, product recommendations, and/or information pertaining to their financial card(s) and other accounts.

The institution system 5 may comprise one or more computing devices 6. The user computing device 95 may allow the user 90 to interact with the computing device(s) 6. The computing device(s) 6 may have one or more processors 7, storage 8 (e.g., storage devices, memory, etc.), and software modules 9. The computing device(s) 6, including its processor(s) 7, storage 8, and software modules 9, may be used in the performance of the techniques and operations described herein. Information associated with the user, products, and/or services, may be stored in storage 8 or other storage, for example.

Example software modules may include modules for sending and receiving information between the institution system 5 and the user 90 as well as between the institution system 5 and the prepaid service provider 50 and the credit card processor/vendor 52, requesting and retrieving information from storage 8, information storage 22, and user storage 24, processing financial card requests and account changes received from the user 90, and generating web pages, described further herein. While specific functionality is described herein as occurring with respect to specific modules, the functionality may likewise be performed by more, fewer, or other modules. The functionality may be distributed among more than one module. An example computing device and its components are described in more detail with respect to FIG. 6.

A financial card that may have its operating mode changed between a credit card mode and a prepaid card mode may be applied for by a person (a user) and issued in that person's name. The person may then give the financial card to another person (a cardholder) who may use the card for making purchases. In an implementation, a parent may be the user, and a child may be the cardholder. In another implementation a person with a good credit history or rating may get a financial card and give it to another person whose credit history or rating is not as good. These and other implementations may allow a user to monitor the cardholder's financial activity and spending, and assist a user in teaching a cardholder financial responsibility and accountability.

Figure 2:
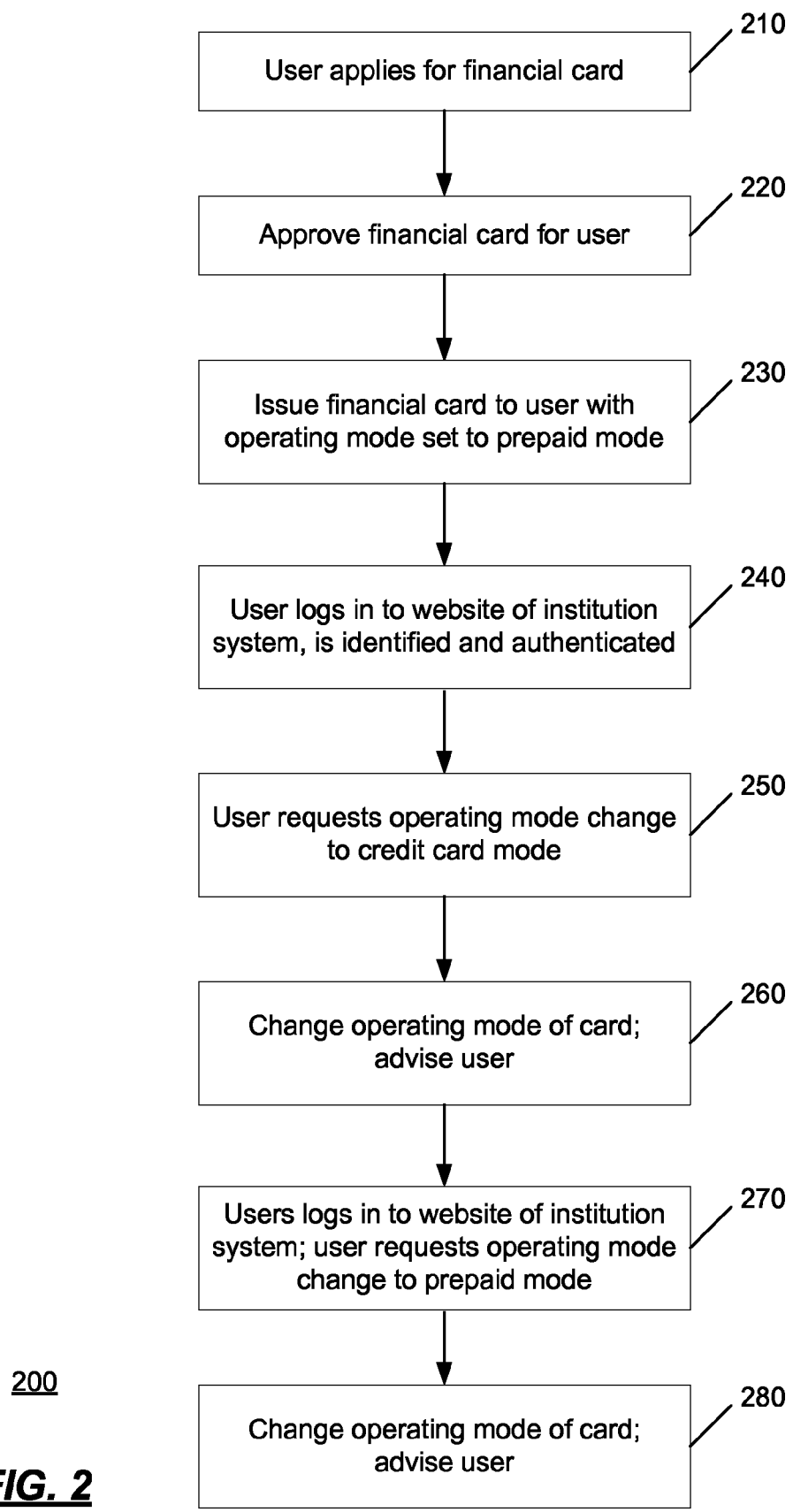
FIG. 2 is an operational flow of an implementation of a method that may be used to provide financial card management.

FIG. 2 is an operational flow of an implementation of a method 200 that may be used to provide financial card management. At operation 210, a user may apply for a financial card via the institution system. The user may be approved for a financial card, based on the institution system's internal policies and the user's credit history or rating, for example, at operation 220. At operation 230, a financial card may be issued to the user, with the operating mode of the financial card set to behave like a prepaid card. A credit card allows spending into the negatives, but the institution system prevents this behavior when the card is set to a prepaid card operating mode. The financial card acts like a credit card that may only have a positive balance or a zero balance.

At some point, the user may wish to change the operating mode of the financial card, or some other aspect of the financial card, such as rules or gift givers, described further herein. At operation 240, the user may log into a website and identify and authenticate themselves. At operation 250, the user may request that the card to behave like a credit card instead of a prepaid card. The user may make this request by selecting a change card mode button or icon that is presented on the web page, for example. Such a selection may take the form of highlighting the button or icon, clicking on the button or icon, or any other known form of selection. It is contemplated that the user may also request a financial card operating mode change by contacting the institution system in other ways, such as by email, telephone, or facsimile, for example.

The institution system may grant the request at operation 260, change the card behavior to the operating mode selected by the user, and advise the user on the website or by email, telephone, or facsimile, for example. The user may log out of the website. At some point, the user wish to change the operating mode again, this time back to a prepaid card mode. At operation 270, the user may log back into the website or otherwise contact the institution system, identify and authenticate themselves, and request that the card be changed to behave like a prepaid card. The institution system may receive the request, grant the request, and notify the user, at operation 280.

In this manner, for example, a parent (a user) may get a financial card for a child (a cardholder), have it set as a prepaid card until the parent feels the child is responsible enough for credit, and then may change the card to behave like a credit card. Thereafter, if the parent believes that the child is not responsible enough for credit, the parent may change the operating mode of the financial card back to a prepaid card, e.g., via the website. This may help to provide the cardholder some experience with money management and budgeting while lowering or eliminating the risk of debt or finance charges.

Although example implementations may be described with respect to credit card and prepaid card operating modes, it is contemplated that additional operating modes may be offered by the institution system. In an implementation, a financial card may be associated with a checking account, savings account, direct deposit account, etc. of the user, and the financial card may be set to behave like a debit card. In this manner, a user may access the institution system and change the operating mode of the financial card to behave like a debit card, for example.

Figure 3:
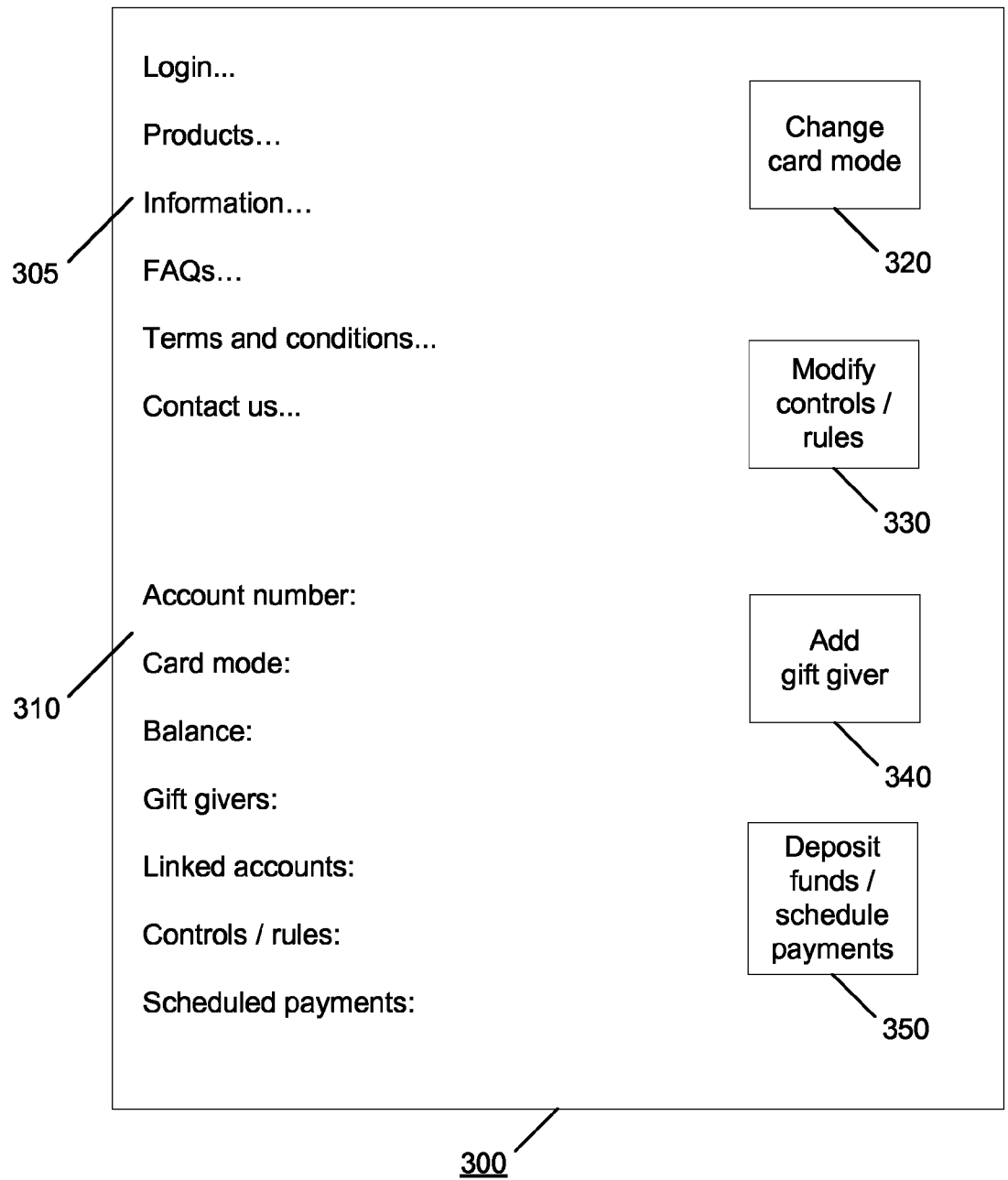
FIG. 3 is an implementation of an example screen shot that may be provided to a user for financial card management.

FIG. 3 is an implementation of an example screen shot 300 that may be provided to a user for financial card management. The screen shot 300 may be of a web page that is provided to the user via a financial services institution or a financial services website, for example.

The screen shot 300 may comprise a common area 305 that may include items such as login information and prompts and contact information. The common area 305 may include data pertaining to products, rates, terms and conditions, frequently asked questions (FAQs) and other information provided by, or available through, the financial services institution, for example. Such a common area 305 is optional and may comprise any information or data. The information and data presented in FIG. 3 are examples only.

A financial card area 310 may be provided on the screen shot 300 that is directed to a user's financial card and may be informational and/or contain promotional material about the financial card. In an implementation, information pertaining to the financial card may be provided, such as account number, current operating mode (e.g., prepaid, credit, etc.), balance (e.g., prepaid balance, credit balance available, balance owed, etc.), gift givers, linked accounts, controls/rules, and scheduled payments, for example.

A change card mode button or icon 320 may be provided on the screen shot 300. The change card mode button or icon 320 may be selected by a user. Selecting the change card mode button or icon 320 allows the user to change the current operating mode or behavior of the card, e.g., from prepaid to credit or vice versa for example. A user may select the change card mode button or icon 320 by highlighting it and/or clicking on it for example.

Other buttons or icons that may be provided on the screen shot 300 may include a modify controls/rules button or icon 330, an add gift giver button or icon 340, and/or a deposit funds/schedule payments button or icon 350, for example. Selecting a modify controls/rules button or icon 330 allows a user to add, delete, or change controls or rules relating to the financial card, such as transaction and spending limits, limits as to the types of purchases that may be made or the merchants that are authorized to accept the financial card, and the types of purchases that may be made on credit and the types of purchases that may be made as prepaid or debit, for example. In an implementation, some controls may be considered to be parental controls whereby the user (a parent) provides rules or controls on how the cardholder (a child) may use the financial card.

An add gift giver button or icon 340 may allow a user to add, delete, or modify people or accounts that may provide funds to the financial card. In an implementation, after identifying a person as a gift giver, the institution system may contact that person with instructions as to how to provide funds to the financial account (e.g., give a financial gift to the user or cardholder). A deposit funds/schedule payments button or icon 350 may allow a user to deposit funds to the financial card, either as a one time deposit or as recurring deposits. In an implementation, the user may specify an account (e.g., account number, routing number, etc.) from which the funds may be electronically transferred.

It is contemplated that the various buttons or icons may be provided and displayed on multiple web pages of a website. The example information, data, and items shown in FIG. 3 are examples only and are not intended to be limiting.

Figure 4:
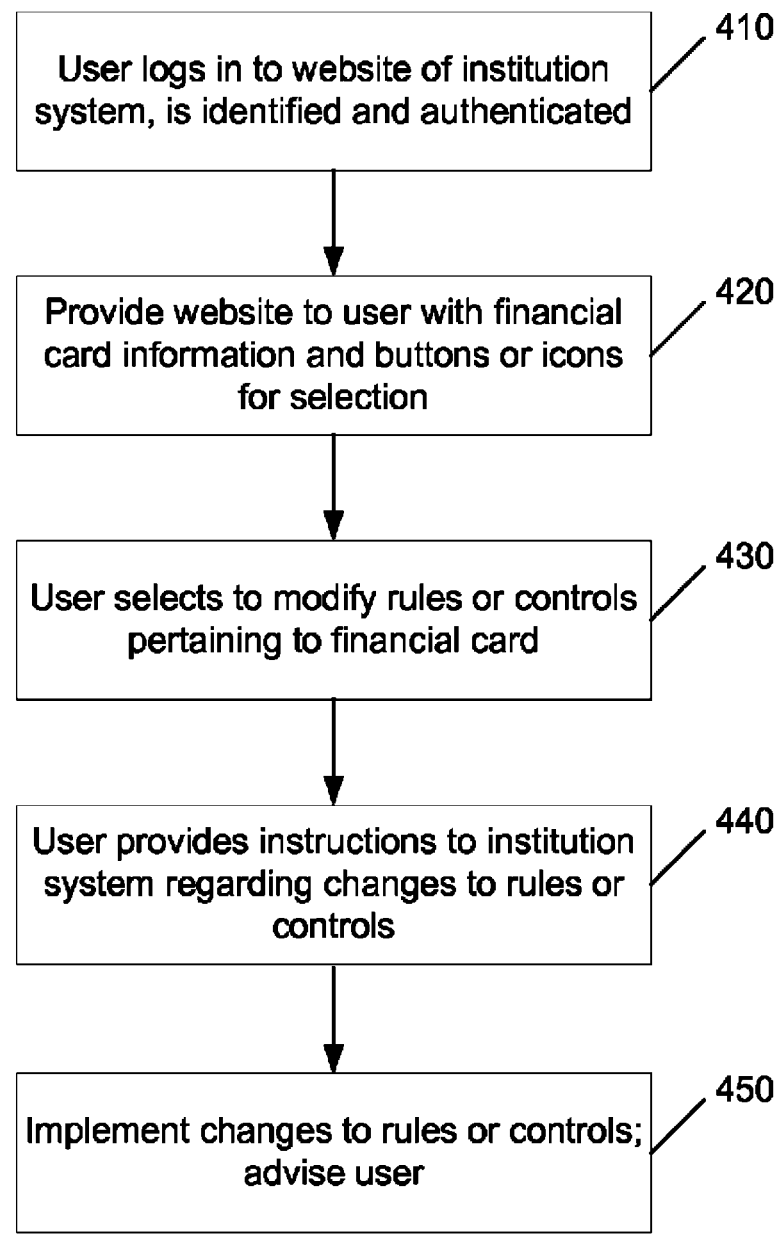
FIG. 4 is an operational flow of another implementation of a method that may be used to provide financial card management.

FIG. 4 is an operational flow of another implementation of a method 400 that may be used to provide financial card management. At operation 410, a user who already has a financial card may log into a website associated with the institution system and may be identified and authenticated using any known techniques. A web page may then be provided to the user at operation 420. An example screen shot of such a web page is described with respect to FIG. 3. The user may then select to modify the rules or controls pertaining to the financial card at operation 430, e.g., by selecting a modify controls/rules button or icon. Such a selection may take the form of highlighting the button or icon, clicking on the button or icon, or any other known form of selection. In another implementation, the user may modify the controls or rules via email or telephone, for example.

The user may provide instructions to the institution system at operation 440 to implement, add, delete, change, or select various actions such as being notified about spending on the financial card, limiting spending to certain types of purchases or certain stores or merchants (e.g., based on merchant codes), setting spending limits on the card (e.g., maximum spending amounts per day, maximum number of transactions per day, etc.). The user may also set credit limits and suspend or resume card activity, for example. The user may instruct that some purchases (e.g., purchases at a school bookstore) are to be processed as credit purchases, while other purchases (e.g., purchases at a videogame store) are to be processed as debit purchases, for example. In an implementation, the user may view or be advised of any prepaid balance, credit balance, and/or balance owed on the financial card. The institution system may confirm and implement the instructions at operation 450.

Figure 5:
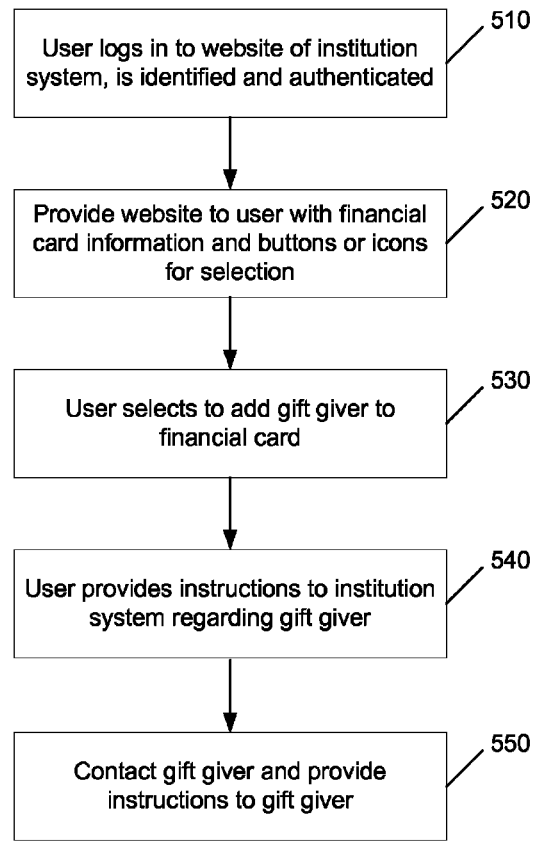
FIG. 5 is an operational flow of another implementation of a method that may be used to provide financial card management.

FIG. 5 is an operational flow of another implementation of a method 500 that may be used to provide financial card management. At operation 510, a user who already has a financial card may log into a website associated with the institution system and may be identified and authenticated using any known techniques. A web page may then be provided to the user at operation 520. An example screen shot of such a web page is described with respect to FIG. 3. The user may then select to add a gift giver pertaining to the financial card at operation 530, e.g., by selecting an add gift giver button or icon. Such a selection may take the form of highlighting the button or icon, clicking on the button or icon, or any other known form of selection. In another implementation, the user may add a gift giver via email or telephone, for example. It is contemplated that a user may also delete, change, or modify gift givers via these or similar techniques.

The user may provide instructions to the institution system at operation 540 to add a gift giver, so that that the gift giver may provide funds to the financial card. In an implementation the user may provide information pertaining to the gift giver such as name and contact information. At operation 550, the institution system may contact the gift giver and provide instructions as to how the gift giver may provide funds to the financial card. Instructions may include log on information and requests for account information, for example.

The gift giver may give monetary payments to the financial card (e.g., to the user or the cardholder) regardless of the operating mode of the financial card. If the financial card is in a prepaid mode, funds may be added to the card. If the financial card is in credit mode, funds may be added to the balance as a payment or if there is no balance it may be considered to be a prepaid balance. Thus, the cardholder may receive either a credit balance or a payment towards the balance they owe.

A user or a gift giver may add funds to the financial card or make payments at any time. In an implementation, a user or a gift giver may set up an allowance schedule to transfer funds to the financial card regularly (i.e., make recurring deposits). The user or a gift giver may provide payment scheduling information to the institution system, such as the amount that funds are to be transferred from, the account number, the institution that holds the account, and the routing (ABA) number, for example, along with a payment or transfer schedule. It is contemplated that the user may implement a rule that limits the amount of money that may be loaded onto the financial card. In an implementation, any amount over this user set limit may be transferred to a savings account, for example.

Exemplary Computing Arrangement

Figure 6:
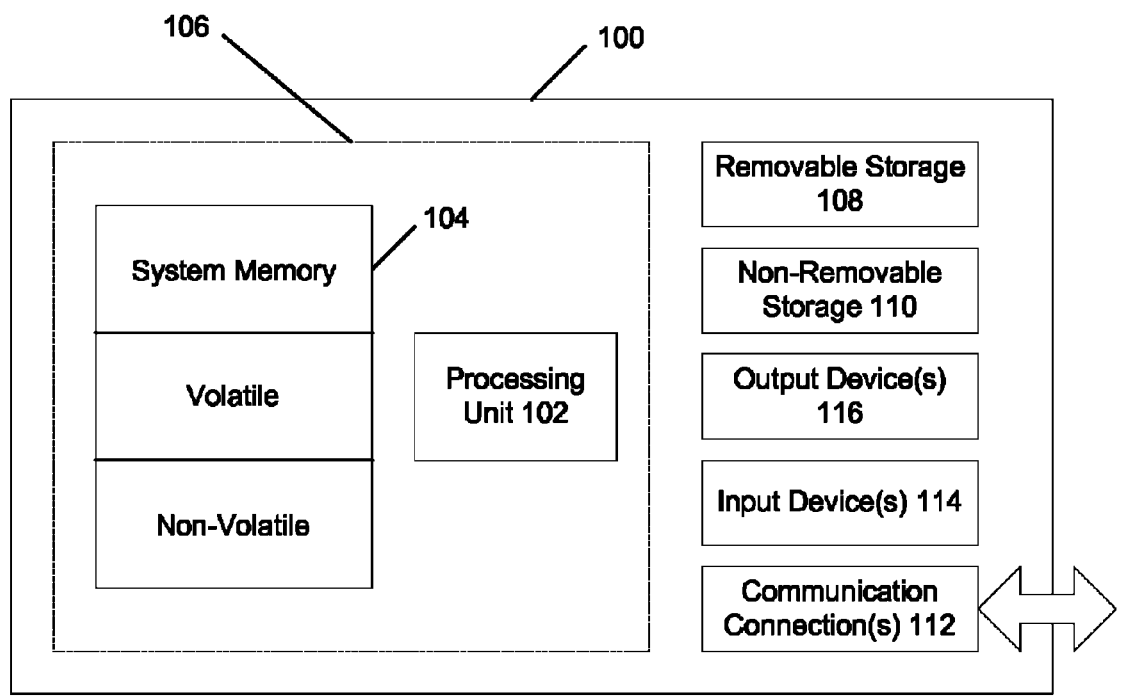
FIG. 6 is a block diagram of an example computing environment in which example embodiments and aspects may be implemented.

FIG. 6 shows an exemplary computing environment in which example embodiments and aspects may be implemented. The computing system environment is only one example of a suitable computing environment and is not intended to suggest any limitation as to the scope of use or functionality.

Numerous other general purpose or special purpose computing system environments or configurations may be used. Examples of well known computing systems, environments, and/or configurations that may be suitable for use include, but are not limited to, PCs, server computers, handheld or laptop devices, multiprocessor systems, microprocessor-based systems, network PCs, minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 6, an exemplary system for implementing aspects described herein includes a computing device, such as computing device 100. In its most basic configuration, computing device 100 typically includes at least one processing unit 102 and system memory 104. Depending on the exact configuration and type of computing device, system memory 104 may be volatile (such as random access memory (RAM)), non-volatile (such as read-only memory (ROM), flash memory, etc.), or some combination of the two. This most basic configuration is illustrated in FIG. 6 by dashed line 106.

Computing device 100 may have additional features and/or functionality. For example, computing device 100 may include additional storage (removable and/or non-removable) including, but not limited to, magnetic or optical disks or tape. Such additional storage is illustrated in FIG. 6 by removable storage 108 and non-removable storage 110.

Computing device 100 typically includes a variety of computer-readable media. Computer-readable media can be any available media that can be accessed by computing device 100 and includes both volatile and non-volatile media, and removable and non-removable media. By way of example, and not limitation, computer-readable media may comprise computer storage media and communication media.

Computer storage media include volatile and non-volatile, and removable and non-removable media implemented in any method or technology for storage of information such as computer-readable instructions, data structures, program modules or other data. System memory 104, removable storage 108, and non-removable storage 110 are all examples of computer storage media. Computer storage media include, but are not limited to, RAM, ROM, Electrically Erasable Programmable Read-Only Memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of computing device 100.

Computing device 100 may also contain communication connection(s) 112 that allow the computing device 100 to communicate with other devices. Communication connection(s) 112 is an example of communication media. Communication media typically embody computer-readable instructions, data structures, program modules, or other data in a modulated data signal such as a carrier wave or other transport mechanism, and include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, radio frequency (RF), infrared, and other wireless media. The term computer-readable media as used herein includes both storage media and communication media.

Computing device 100 may also have input device(s) 114 such as a keyboard, mouse, pen, voice input device, touch input device, etc. Output device(s) 116 such as a display, speakers, printer, etc. may also be included. All these devices are well known in the art and need not be discussed at length here.

Computing device 100 may be one of a plurality of computing devices 100 inter-connected by a network. As may be appreciated, the network may be any appropriate network, each computing device 100 may be connected thereto by way of communication connection(s) 112 in any appropriate manner, and each computing device 100 may communicate with one or more of the other computing devices 100 in the network in any appropriate manner. For example, the network may be a wired or wireless network within an organization or home or the like, and may include a direct or indirect coupling to an external network such as the Internet or the like.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high level procedural or object-oriented programming language to communicate with a computer system. However, the program(s) can be implemented in assembly or machine language, if desired. In any case, the language may be a compiled or interpreted language and it may be combined with hardware implementations.

Although exemplary embodiments may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A financial card management method, comprising:
   issuing a financial card to a cardholder by a financial services institution, the financial card being operable in either a prepaid mode or a credit mode, wherein the financial card, the prepaid mode, and the credit mode are each associated with a same single account;

receiving input, from a user at a website of the financial services institution,
  wherein the input includes:
    a revocable selection of one of either the prepaid mode or the credit mode for future transactions made using the financial card, and
    a restriction on types of purchases which may be made using the credit mode,
  wherein the selection of the one of either the prepaid mode or the credit mode precludes use of the other of the prepaid mode or the credit mode until another selection is received at the computing device;
authorizing a transaction in the selected mode, wherein the transaction is made by the cardholder using the financial card;
receiving funds for the account at the computing device; and
applying the funds to the account, using the computing device, in accordance with a rule.

2. The method of claim 1, wherein applying the funds to the account in accordance with the rule comprises applying the funds to a prepaid balance associated with the prepaid mode.

3. The method of claim 1, wherein applying the funds to the account in accordance with the rule comprises applying the funds to a debt associated with the credit mode.

4. The method of claim 1, wherein the user is not the cardholder.

5. The method of claim 1, wherein the cardholder is not authorized to provide the input.

6. The method of claim 1, wherein the input further includes information identifying a gift giver and receiving the funds for the account comprises receiving funds from an account of the gift giver.

7. A non-transitory computer-readable medium comprising computer-executable instructions for financial card management, said computer-executable instructions comprising instructions that, when executed by one or more processors, direct the one or more processors to:
  issue a financial card to a cardholder, the financial card being operable in either a prepaid mode or a credit mode, wherein the financial card, the prepaid mode, and the credit mode are each associated with a same single account;
  receive input, at a website from a user,
    wherein the input includes:
      a revocable selection of one of either the prepaid mode or the credit mode for future transactions using the financial card, and
      a restriction on types of purchases which may be made using the credit mode,
    wherein the selection of the one of either the prepaid mode or the credit mode precludes use of the other of the prepaid mode or the credit mode until another selection is received;
  authorize a transaction in the selected mode, wherein the transaction is made by the cardholder using the financial card;
  receive funds for the account; and
  apply the funds to the account in accordance with a rule.

8. The non-transitory computer-readable medium of claim 7, where applying the funds to the account in accordance with the rule comprises applying the funds to a prepaid balance associated with the prepaid mode.

9. The non-transitory computer-readable medium of claim 7, where applying the funds to the account in accordance with the rule comprises applying the funds to a debt associated with the credit mode.

10. The non-transitory computer-readable medium of claim 7, where the user is not the cardholder.

11. The non-transitory computer-readable medium of claim 7, wherein the input further includes a restriction on types of purchases which may be made using the prepaid mode.

12. The non-transitory computer-readable medium of claim 7, wherein the input further includes information identifying a gift giver and receiving the funds for the account comprises receiving funds from an account of the gift giver.

13. A financial card management system, comprising:
  one or more computers;
  at least one subsystem of the one or more computers that issues a financial card to a cardholder, the financial card being operable in either a prepaid mode or a credit mode, wherein the financial card, the prepaid mode, and the credit mode are each associated with a same single account;
  at least one subsystem of the one or more computers that receives input, at a website from a user,
    wherein the input includes:
      a revocable selection of one of either the prepaid mode or the credit mode for future transactions using the financial card, and
      a restriction on types of purchases which may be made using the financial card;
    wherein the selection of the one of either the prepaid mode or the credit mode precludes use of the other of the prepaid mode or the credit mode until another selection is received;
  at least one subsystem of the one or more computers that authorizes a transaction made by the cardholder in the selected mode;
  at least one subsystem of the one or more computers that receives funds for the account; and
  at least one subsystem of the one or more computers that applies the funds to the account in accordance with a rule.

14. The system of claim 13, wherein applying the funds to the account in accordance with the rule comprises applying the funds to a prepaid balance associated with the prepaid mode.

15. The system of claim 13, wherein applying the funds to the account in accordance with the rule comprises applying the funds to a debt associated with the credit mode.

16. The system of claim 13, wherein the user is not the cardholder.

17. The system of claim 13, wherein the input further includes a restriction on types of merchants authorized to accept the financial card.

18. The system of claim 13, wherein the input further includes information identifying a gift giver and receiving the funds for the account comprises receiving funds from an account of the gift giver.

* * * * *